United States Patent
Kyooka et al.

(10) Patent No.: US 11,982,545 B2
(45) Date of Patent: May 14, 2024

(54) MAGNETIC PROBING DEVICE

(71) Applicant: KYOOKA Co., Ltd., Tokyo (JP)

(72) Inventors: Yoshiteru Kyooka, Tokyo (JP); Keiji Igarashi, Yamagata (JP)

(73) Assignee: KYOOKA CO., LTD., Tokyo (JP)

( * ) Notice: Subject to any disclaimer, the term of this patent is extended or adjusted under 35 U.S.C. 154(b) by 11 days.

(21) Appl. No.: 17/922,104

(22) PCT Filed: May 10, 2021

(86) PCT No.: PCT/JP2021/017645
§ 371 (c)(1),
(2) Date: Oct. 28, 2022

(87) PCT Pub. No.: WO2021/230182
PCT Pub. Date: Nov. 18, 2021

(65) Prior Publication Data
US 2023/0168108 A1  Jun. 1, 2023

(30) Foreign Application Priority Data

May 11, 2020 (JP) ................................ 2020-083185

(51) Int. Cl.
G01D 5/14 (2006.01)
(52) U.S. Cl.
CPC ....................................... G01D 5/14 (2013.01)
(58) Field of Classification Search
CPC ........................................................ G01D 5/14
See application file for complete search history.

(56) References Cited

U.S. PATENT DOCUMENTS 5,049,151 A * 9/1991 Durham ............. A61B 17/1725
606/98
2008/0048635 A1   2/2008 Hughes

FOREIGN PATENT DOCUMENTS

| JP | 44-980 | B1 | 1/1969 | |
| JP | 61-193389 | U1 | 12/1986 | |
| JP | 11-83963 | A | 3/1999 | |
| JP | 2009-174906 | A | 8/2009 | |
| JP | 2009174906 | A * | 8/2009 | |
| JP | 5461894 | B2 | 4/2014 | |
| WO | WO-2011007845 | A1 * | 1/2011 | ............. B23B 39/14 |

OTHER PUBLICATIONS

International Search Report issued in International Bureau of WIPO Patent Application No. PCT/JP2021/017645, dated Jul. 6, 2021, along with an English translation thereof.
Extended European Search Report issued in European patent application No. 21803962.6, dated Feb. 5, 2024.

* cited by examiner

Primary Examiner — Walter L Lindsay, Jr.
Assistant Examiner — Milton Gonzalez
(74) Attorney, Agent, or Firm — Greenblum & Bernstein, P.L.C.

(57) ABSTRACT

Provided is a magnetic probe including: a support shaft; a magnetic field generator fixed to one end of the support shaft and interacting with a magnetic field formed by a magnetic marker and a geomagnetic field; and a compensation magnetic field generator fixed to the other end of the support shaft and interacting with the geomagnetic field, the magnetic field generator and the compensation magnetic field generator being configured to interact with the geomagnetic field to offset torques around a rotation center of the magnetic probe.

5 Claims, 5 Drawing Sheets (a)

(b)

MAGNETIC PROBING DEVICE

TECHNICAL FIELD

The present invention relates to a magnetic probing device for probing the position of a magnetic marker arranged on the back surface of a processed surface of an object.

BACKGROUND ART

In assembly technology for ships, aircraft, automobiles, and the like, when assembling an external panel and an internal component, it is necessary to specify a position on the external panel that is concentric with a hole of the internal component, make a hole in the panel, and join them with a bolt or the like. Thus, the concentric position of the hole is usually specified visually from a cross-sectional direction for joining, and processing is performed. Lightweight and high-strength carbon fiber has been recently used as a material for ships, aircraft, automobiles, and the like, and members are being implemented as single plates and the size of members is increasing. Consequently, it becomes difficult to specify the position for the hole processing, and when a member is thicker, it becomes more difficult to perform high-precision probing.

As disclosed in Japanese Patent No. 5461894 (Patent Literature 1), to improve the accuracy of magnetic probing, there has been developed a magnetic probing device employing a bearing mechanism as the rotation axis of a gimbal mechanism that supports the support shaft of a magnetic probe in a swingable manner, thereby reducing friction caused by the rotation of the magnetic probe.

SUMMARY OF THE INVENTION

To improve the magnetic probing accuracy, it is necessary to improve the magnetic measurement sensitivity by minimizing friction of a rotation mechanism fixed to the body of the magnetic probing device, and minimizing shaking of the fixture. However, it has been clarified that there is a limit in the measurement accuracy due to measurement errors even if the measurement sensitivity is improved. That is, even when magnetic probing measurement is performed in a measurement environment in which tools, jigs, and the like, containing magnetic materials capable of magnetically interacting with the magnetic marker are completely excluded, it has been found that the direction of the magnetic probe tends to deviate from the position of the magnetic marker.

In the case of replacing or repairing a member in aircraft body repair, when installing a reinforcing member on the aircraft body, it may be necessary to install a plate-like member or the like without a jig in a short period of time. Efficient and accurate positioning may be necessary depending on the situation in which the work is performed within the constraints of the operation schedule or the like in a maintenance hangar or the like, for example. In such a case, the processing position should be determined quickly to achieve the alignment, in consideration of various restrictions on the hole position of the member. In response to such demand, there is an urgent need to develop a magnetic probing device that can respond quickly to various demands with high accuracy.

The present invention has been made in view of these issues, and the present invention provides a magnetic probing device capable of performing magnetic probing of a processing position with higher accuracy and speed even when an object is a thick non-magnetic material.

According to a technical aspect of the present invention, a magnetic probing device arranging a magnetic marker at a predetermined position of a non-magnetic object, probing a magnetic field formed by the magnetic marker through the object, and specifying a position corresponding to the predetermined position, the magnetic probe includes a body arranged at a predetermined position on a surface of the object, a magnetic probe having a rotation center aligned and fixed to the body through a biaxial gimbal mechanism, and a display that displays an orientation of the magnetic probe, wherein the magnetic probe includes a support shaft supported by the biaxial gimbal mechanism, a magnetic field generator fixed to one end of the support shaft and interacting with a magnetic field formed by the magnetic marker and a geomagnetic field, and a compensation magnetic field generator fixed to the other end of the support shaft and interacting with the geomagnetic field, and the magnetic field generator and the compensation magnetic field generator are configured to interact with the geomagnetic field to cancel torques around the rotation center of the magnetic probe.

DESCRIPTION OF EMBODIMENTS

A preferred embodiment according to the present invention is described with reference to the drawings.

Verification of Measurement Error and Background Magnetic Field

Figure 2:
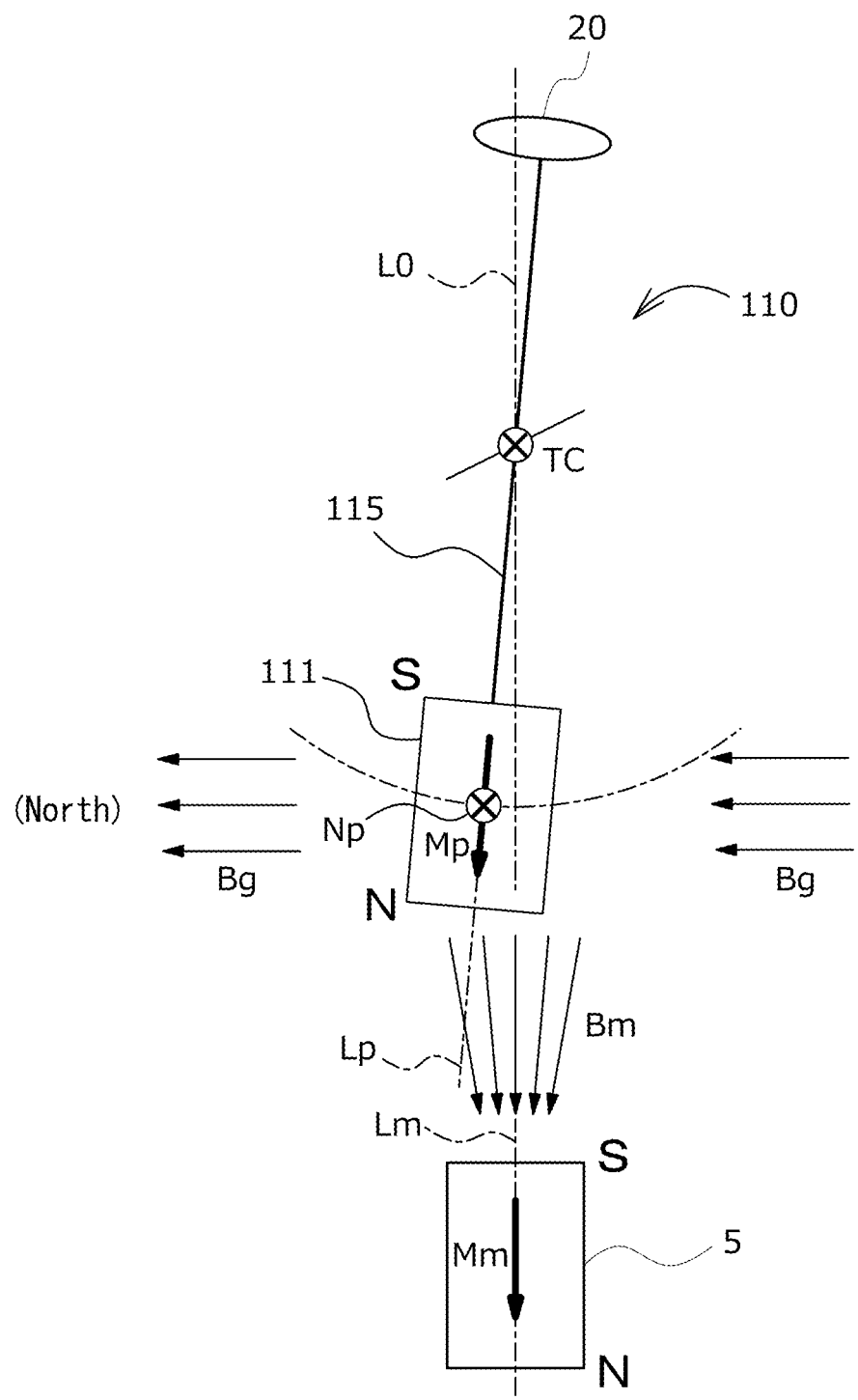
FIG. 2 is a schematic diagram illustrating effects of the magnetic environment.

Referring to FIG. 2, a magnetic reference axis Lm defined by the magnetic field formed by a magnetic marker 5 is probed based on the orientation of a magnetic probe 110 utilizing the magnetic interaction between the magnetic marker 5 and the magnetic probe 110. Here, the magnetic probing sensitivity is improved by reducing the frictional force and the like in the swing mechanism of the magnetic probe, which is an obstructive factor, as much as possible. However, an issue has been found that a direction Lp directed by the main axis of the magnetic probe 110 does not coincide with the magnetic reference axis Lm even when the magnetic probing sensitivity is improved. That is, an issue has been clarified that although a rotation center TC of the magnetic probe 110 is positioned on the magnetic reference axis Lm defined by the magnetic marker 5, a main axis Lp of the magnetic probe 110 tilts and does not exactly coincide with the magnetic reference axis Lm. Since there is a constant tendency in this deviation, it has been found that the magnetic interaction between the magnetic marker 5 and the magnetic probe 110 is of a significant size to the extent that magnetic probing is possible, and the deviation may be caused by the bias of other magnetic factors.

Thus, as a result of conducting magnetic probing measurement in a measurement environment in which tools, jigs, and the like containing magnetic materials capable of magnetically interacting with the magnetic marker 5 are completely excluded and other causes are intensively examined, it has become clear that the magnetic interaction between a geomagnetic field Bg and the magnetic probe 110 cannot be ignored in an environment in which high-precision magnetic probing is performed.

In FIG. 2, the magnetic marker 5 includes a permanent magnet having a magnetic moment Mm, and the upper side in the drawing is the S-pole and the lower side is the N-pole. The magnetic field generated by the magnetic marker 5 is represented by lines of magnetic force Bm, and the lines of magnetic force Bm extend from the magnetic poles (S, N) in the direction of the imaginary magnetic reference axis Lm. A magnetic field generator 111 of the magnetic probe 110 includes a permanent magnet, and the upper side in the drawing is the S-pole and the lower side is the N-pole. The magnetic generator 111 has a magnetic moment Mp directed along a main shaft 115 of the magnetic probe 110 and magnetically interacts with the lines of magnetic force Bm, and thus a magnetic force acts so that the main axis (main shaft 115 direction) of the magnetic probe 110 is directed to the reference axis Lm of the magnetic marker 5. Thus, when the rotation center TC of the magnetic probe 110 is positioned on the magnetic reference axis Lm, the magnetic field generator 111 should also be directed to the magnetic marker 5 directly below in the drawing.

However, when the geomagnetic field acts in a significant manner as a background magnetic field, the magnetic probe 110 may tilt slightly. That is, in FIG. 2, when the left side in the drawing is the north direction (the S-pole side), the lines of magnetic force Bg of the geomagnetic field act on the magnetic field generator 111 from the lateral direction. Thus, a torque Np that is clockwise in the drawing acts on the magnetic field generator (permanent magnet having the magnetic moment Mp) 111 and a clockwise torque around the rotation center TC is generated in the magnetic probe 110 in response thereto, and thus the position of the magnetic field generator 111 is offset to the left, causing a measurement error. Although related magnetic probing device do not have such an offset issue, it has been understood that the effect of the geomagnetic field as a background magnetic field becomes apparent as a measurement error because the magnetic detection sensitivity is improved by subsequent improvements and it becomes possible to detect a smaller magnetic field. Therefore, a magnetic probing device with higher precision has been developed considering the existence of a background magnetic field, which affects such magnetic probing errors.

A background magnetic field refers to a magnetic field environment that is regarded as spatially uniform in the area to be probed magnetically, and is typically a geomagnetic field. Note that the geomagnetic field does not have to be directed in the horizontal direction, and is only necessary to be a uniform magnetic field within the probing area.

Structure of Magnetic Probing Device

Figure 1:
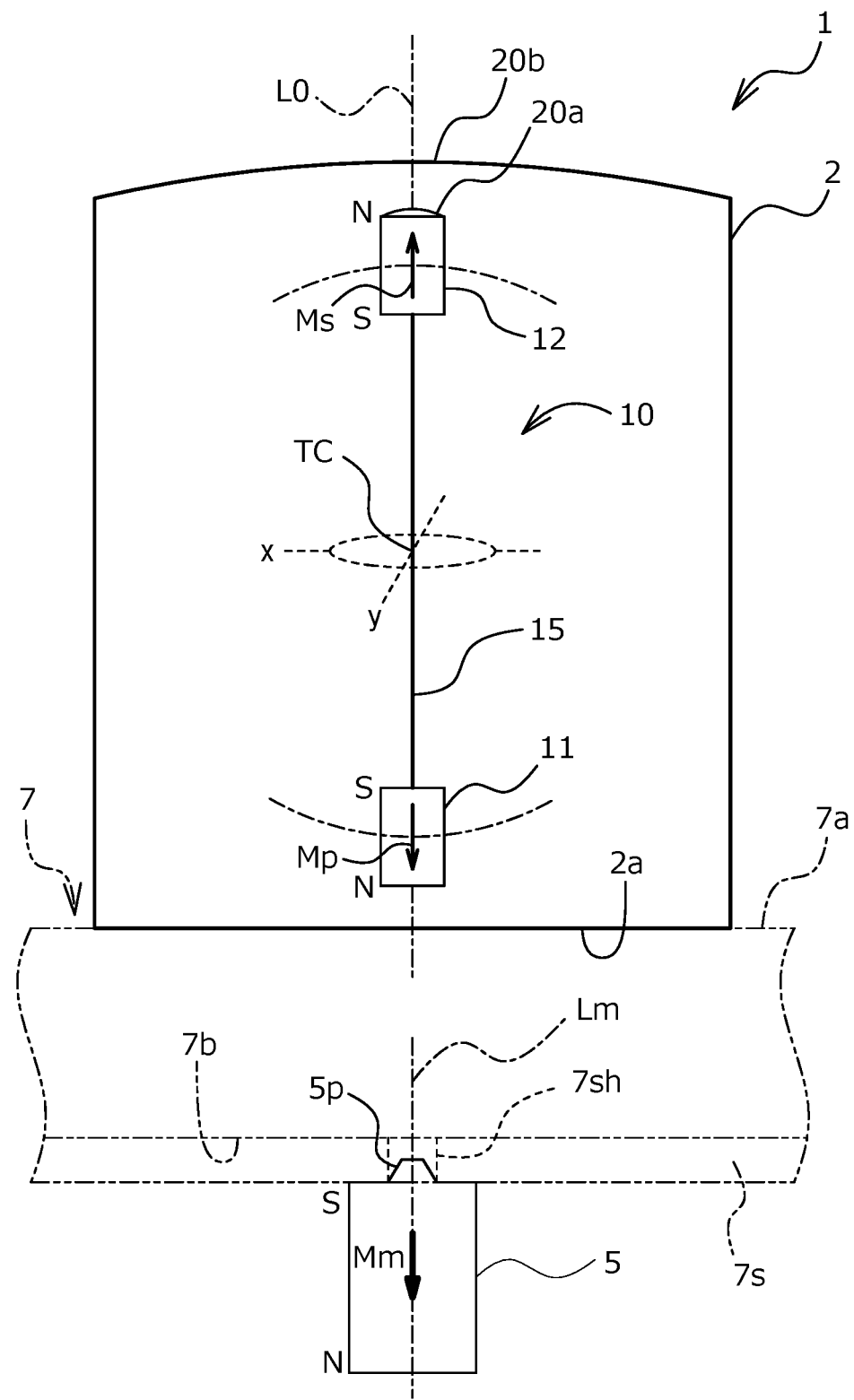
FIG. 1 is a schematic diagram illustrating the principle of a magnetic probing device according to the present invention.

FIG. 1 is a schematic diagram of a magnetic probing device 1 according to the present embodiment. A processed object 7 has a predetermined thickness and is made from a nonmagnetic material such as carbon fiber. When a hole processing position is determined on a first surface (back surface) 7b of the processed object 7, the magnetic marker 5 is arranged at the position. A spacer (plate material) 7s is inserted between the first surface 7b of the processed object 7 and the magnetic marker 5, and a convex part 5p of the magnetic marker 5 is engaged with a through hole 7sh for aligning and fixing the magnetic marker 5 at the hole processing position. The magnetic marker 5 includes the permanent magnet, and lines of magnetic force extend in the direction of the magnetic reference axis Lm from the magnetic pole (S).

The magnetic probing device 1 probes through the processed object 7 for a magnetic field generated by the magnetic marker 5 on a second surface (probing surface) 7a opposed to the first surface 7b on which the magnetic marker 5 is arranged. The magnetic probing device 1 has a bottom surface 2a of a body 2 as a magnetic probing surface and probes while moving on the probing surface 7a.

The magnetic probing device 1 includes the body 2, a magnetic probe 10 for detecting a magnetic field generated by the magnetic marker 5, a bearing assembly (x, y) for supporting the magnetic probe 10 in a swingable manner inside the body 2, and a display (20a, 20b) for displaying the position of the magnetic probe 10.

The magnetic probe 10 is supported in a swingable manner by the bearing assembly (x, y), which is not illustrated, at the rotation center TC on a main shaft 15, and the rotation center TC is aligned and fixed to the body 2. The rotation center TC is configured to coincide with the center of gravity of the magnetic probe 10. Specifically, the weight of the magnetic field generator 11 is compensated with a compensation magnetic field generator 12 and a sign 20a, which are described later.

A virtual reference line L0 aligned perpendicularly to the bottom surface 2a of the body 2 passes through the rotation center TC, and the magnetic probing is performed in such a way that the reference line L0 coincides with the magnetic reference axis Lm of the magnetic marker 5.

The bearing assembly (x, y) has a two-axis gimbal mechanism (gyroscopic mechanism), which is not illustrated and includes an outer gimbal aligned and fixed inside the body 2 and supported in a swingable manner around a rotation axis x and an inner gimbal aligned and fixed to the outer gimbal and supported in a swingable manner around a y-axis, which is orthogonal to the x-axis. The inner gimbal supports the main shaft (support shaft) 15 of the magnetic probe 10. This enables the magnetic probe 10 to freely swing around the rotation center TC, which is also the center of gravity, and the orientation (tilting) of the magnetic probe 10 is practically caused only by the magnetic field sensed by the magnetic probe 10. A bearing mechanism is employed for the rotation axis of the bearing assembly.

In the magnetic probe 10, the magnetic field generator 11 is mounted on one end of the main shaft 15, and the compensation magnetic field generator 12 is mounted on the other end. The sign 20a for visually confirming the tilting of the magnetic probe 10 is mounted on the end of the compensation magnetic field generator 12, which constitutes the display 20 together with a window part 20b of the body 2.

The magnetic field generator 11 and the compensation magnetic field generator 12 are typically permanent magnets but may be ferromagnetic materials such as iron, cobalt, nickel, or an alloy containing any of these materials. When a ferromagnetic material that is not a permanent magnet is used, it is preferable to adjust the magnetization before probing and confirm the effect that the influence of the background magnetic field is reduced.

Cancelling Background Magnetic Field

Figure 3:
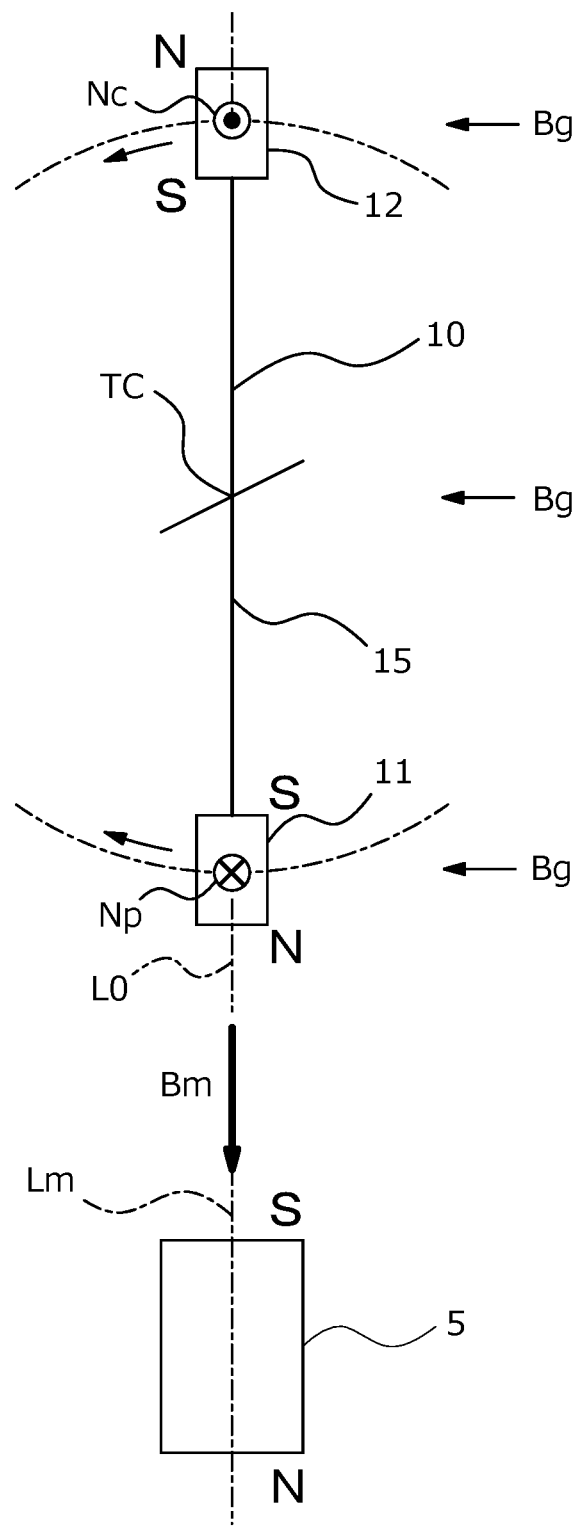
FIG. 3 is a schematic diagram illustrating the principle of background magnetic field compensation.

Referring to FIG. 3, a magnetic field Bm extending from the magnetic marker 5 acts in a direction in which the magnetic field generator 11 is drawn toward the reference axis Lm. At this time, since the geomagnetic field Bg exists as a background magnetic field, a torque Np that is clockwise in the drawing is generated in the magnetic field generator 11, which acts to rotate the magnetic probe 10 in the clockwise direction. In contrast, the compensation magnetic field generator 12 is typically positioned at the same distance as the magnetic field generator 11 with respect to the rotation center TC, and a magnetic moment Ms has the same magnitude as the magnetic moment Mp and is opposite to the magnetic moment Mp in direction. Then, since only the geomagnetic field Bg acts on the compensation magnetic field generator 12, a torque Nc that is counterclockwise in the drawing is generated, and since this acts to rotate the magnetic probe 10 counterclockwise, the effect of the torque Np of the magnetic field generator 11 is cancelled.

The compensation magnetic field generator 12 typically includes a permanent magnet having the same shape and magnetic moment as the magnetic field generator 11. The compensation magnetic field generator 12 is also a counterweight of the magnetic field generator 11 with respect to the rotation center TC. Although the lines of magnetic force Bg of the geomagnetic field are not necessarily in the horizontal direction, the influence of the geomagnetic field is canceled regardless of the direction of the geomagnetic field in an environment where substantially the same magnetic field acts on the magnetic field generator 11 and the compensation magnetic field generator 12. Since the magnetic probe 10 is supported on the bearing assembly (x, y) in swingable and a fully weight balanced manner, the probing surface 7a of the processed object 7 need not be horizontal, and the magnetic probing can be performed at any angle, whether inclined or downward.

In order to eliminate the action of the background magnetic field, since the torques acting on the magnetic field generator 11 and the compensation magnetic field generator 12 only need to cancel each other with respect to the rotation center TC, the respective magnetic moments and distances from the rotation center TC may be changed as appropriate.

In the above configuration, (i) the magnetic field generator 11 interacts with the magnetic field Bm and the background magnetic field (geomagnetic field) Bg of the magnetic marker 5, (ii) the compensation magnetic field generator 12 interacts with the background magnetic field Bg, and (iii) the magnetic moments of the magnetic field generator 11 and the compensation magnetic field generator 12 are of opposite polarity, and the respective effects of the background magnetic field on the magnetic probe cancel each other, and thus the magnetic probing can be performed without being affected by the background magnetic field. That is, even when the force of the magnetic field Bm acting on the magnetic field generator 11 and the effect of the geomagnetic field as the background magnetic field are similar at a distance (the thickness of the processed object) at which the magnetic field formed by the magnetic marker 5 becomes weak in the magnetic probing, it is possible to perform high-precision probing without generating any errors.

Display

Figure 4:
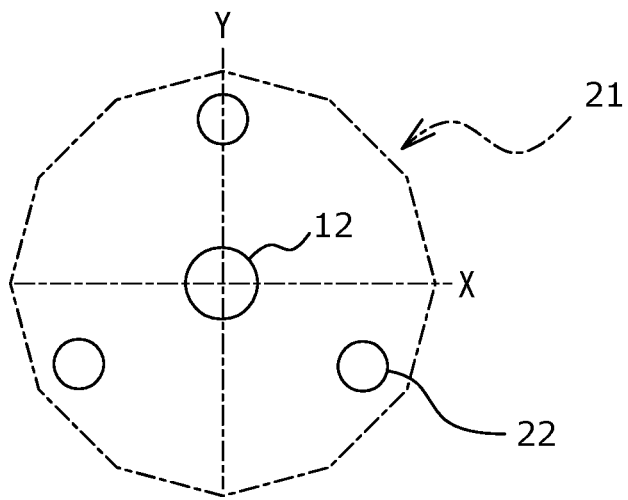
FIG. 4 is a schematic diagram illustrating a relationship between a magnetic sensor and a magnetic probe.
Figure 4:
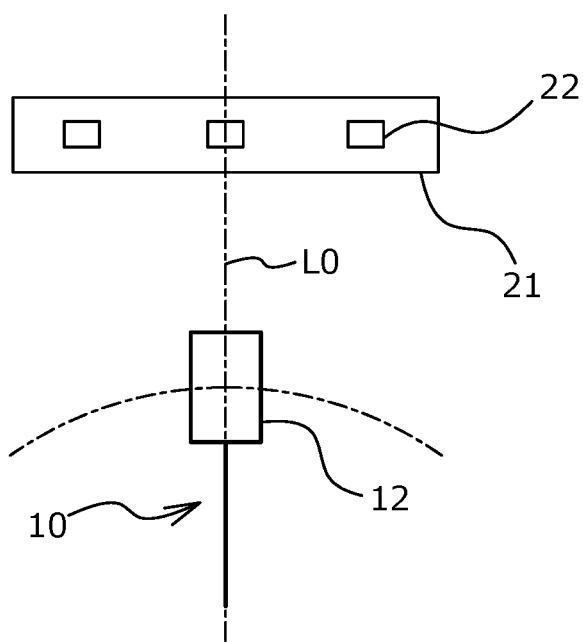
Figure 5:
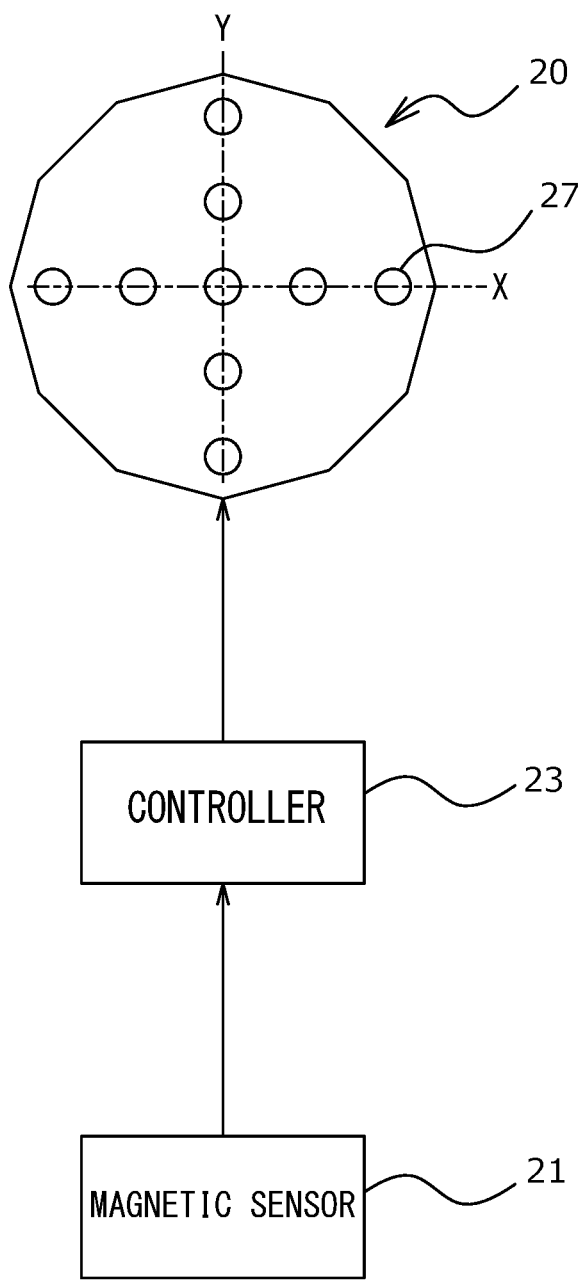
FIG. 5 is a schematic diagram illustrating a display.

FIGS. 4 and 5 illustrate the schematic configuration of the display 20. FIG. 4(*a*) illustrates the positional relationship between the swingable compensation magnetic field generator 12 and a magnetic sensor 21 aligned and fixed to the body 2, viewed from the direction of the main shaft (reference axis) L0 of the body 2. FIG. 4(*b*) illustrates the relationship between the compensation magnetic field generator 12 and the magnetic sensor 21 viewed from the direction perpendicular to the main shaft L0. The tilting state of the magnetic probe 10 has been confirmed by directly visually confirming the position of the sign 20a mounted on one end thereof, but sometimes it is difficult to visually confirm when the magnetic field Bm to be probed is weak, such as when the processed object is thick.

The display 20 according to the present embodiment uses the magnetic field of the compensation magnetic field generator 12 to detect the tilting state of the magnetic probe 10 by means of the magnetic sensor 21 in a non-contact manner and outputs to an indicator 27. The magnetic sensor 21 is aligned and fixed at an upper portion inside the body in a non-contact state with the swingable compensation magnetic field generator 12, and multiple flux gates (magnetic sensing elements) 22 are arranged to surround the main shaft L0 of the body 2. Although three flux gates are used in the present embodiment, six flux gates may be used. As the magnetic sensing elements 22, Hall elements or MR elements may be used as well as flux gates. The magnetic field generated by the compensation magnetic field generator 12 is distributed such that the lines of magnetic force extend from the magnetic pole (N) in the direction of the main axis Lp of the magnetic probe 10. Thus, the relation in density of the magnetic flux of the compensation magnetic field generator 12, which each magnetic sensing element 22 senses, changes corresponding to the positional fluctuation of the magnetic probe 10, and it is possible to detect the tilting state of the magnetic probe 10 without contact.

A controller 23 includes a micro control unit (MCU), which detects a position of the auxiliary magnetic field generator 12 when the auxiliary magnetic field generator 12 deviates from the reference line L0 aligned to the body 2, and causes the corresponding indicator 27 to light up or flash to direct toward the reference line L0 to guide the probing operation of the magnetic probing device 1. The displaying of the position of the magnetic probe 10 is displaying for guiding the magnetic probing and indicates a direction in which the magnetic probing device should move. In the present embodiment, the indicator 27 includes multiple display elements aligned and fixed to the body and arranged along the X axis and the Y axis, which are orthogonal to each other on a plane perpendicular to the main shaft L0. The indicator 27 enables the direction and distance by which the magnetic probing device 1 should move to be visually confirmed when the compensation magnetic field generator 12 is away from the main shaft L0 of the body 2.

When the magnetic probing device 1 (reference axis L0) converges on the reference axis Lm of the magnetic marker 5 and the auxiliary magnetic field generator 12 is positioned on the reference line L0, all the indicators 27 may be turned on. For the indicator 27, light emitting lamps such as multiple LEDs may be used, or an equivalent design may be displayed on a liquid crystal display or an organic EL display. With the display 20 of the present embodiment, it is possible to guide the magnetic probing quickly even when the probe magnetic field Mb is small and it is difficult to visually confirm the tilting of the magnetic probe 10. In the magnetic probing, the magnetic probe 10 swings and converges on the stationary position while oscillating, but in the display of the present embodiment, even when swinging of the magnetic probe 10 does not stop, it is possible for the controller 23 to quickly guide the magnetic probing by estimating the tilting amount from the oscillation width.

According to the present invention, the magnetic probe is provided with a magnetic field generator at one end thereof and a compensation magnetic field generator at the other end thereof, and thus the magnetic field generator magnetically acts with the magnetic field of the magnetic marker and the background magnetic field, and the compensation magnetic field generator magnetically interacts with the background magnetic field, so that the actions of the background magnetic field offset each other and the magnetic probing accuracy is improved. Since the compensation magnetic field generator also acts as a counterweight, the center of gravity of the magnetic probe is easily adjusted. Moreover, it is possible for the display to quickly guide the probing even in a weak magnetic field because it detects the tilting of the magnetic probe by means of the magnetic sensor using the magnetic field of the compensation magnetic field generator.

UNITED STATES DESIGNATION

In connection with United States designation, this international patent application claims the benefit of priority under 35 U.S.C. 119(a) to Japanese Patent Application No. 2020-083185, filed on May 11, 2020 whose disclosed contents are cited herein.

The invention claimed is:

1. A magnetic probing device arranging a magnetic marker at a predetermined position of a non-magnetic object, probing a magnetic field formed by the magnetic marker through the object, and specifying a position corresponding to the predetermined position, the magnetic probing device comprising:
   a body arranged on a surface of the object;
   a magnetic probe having a rotation center aligned and fixed to the body through a biaxial gimbal mechanism; and
   a display displaying a position of the magnetic probe, wherein
   the magnetic probe includes:
      a support shaft supported by the biaxial gimbal mechanism;
      a magnetic field generator fixed to one end of the support shaft and interacting with a magnetic field formed by the magnetic marker and a geomagnetic field; and
      a compensation magnetic field generator fixed to the other end of the support shaft and interacting with the geomagnetic field, and
   the magnetic field generator and the compensation magnetic field generator are configured to interact with the geomagnetic field to cancel torques around the rotation center of the magnetic probe.

2. The magnetic probing device according to claim 1, wherein
   the magnetic field generator and the compensation magnetic field generator are ferromagnetic.

3. The magnetic probing device according to claim 1, wherein
   the magnetic field generator and the compensation magnetic field generator are permanent magnets.

4. The magnetic probing device according to claim 3, wherein
   the display includes a magnetic sensor that is aligned and fixed to the body and detects a magnetic field of the compensation magnetic field generator, and displays the position of the magnetic probe based on the detected magnetic field.

5. The magnetic probing device according to claim 4, wherein
   the magnetic sensor detects a magnetic field by use of a plurality of flux gates.

* * * * *